United States Patent [19]
Druckenmiller et al.

[11] Patent Number: 6,167,435
[45] Date of Patent: Dec. 26, 2000

[54] DOUBLE OPT-IN™ METHOD AND SYSTEM FOR VERIFYING SUBSCRIPTIONS TO INFORMATION DISTRIBUTION SERVICES

[75] Inventors: Ryan Scott Druckenmiller; Rosalind Resnick, both of Brooklyn, N.Y.

[73] Assignee: Netcreations, Inc., New York, N.Y.

[21] Appl. No.: 09/183,365

[22] Filed: Oct. 30, 1998

[51] Int. Cl.⁷ .................................................. G06F 13/00
[52] U.S. Cl. ........................ 709/206; 709/223; 709/224
[58] Field of Search ................................. 709/206, 217, 709/219, 223, 224, 313

[56] References Cited

U.S. PATENT DOCUMENTS

| | | | |
|---|---|---|---|
| 5,796,395 | 8/1998 | Hond | 345/331 |
| 5,864,684 | 1/1999 | Nielsen | 709/206 |
| 6,031,895 | 2/2000 | Cohn et al. | 379/88.13 |

*Primary Examiner*—Viet D. Vu
*Attorney, Agent, or Firm*—Darby & Darby

[57] ABSTRACT

A Double Opt-in™ method and system for generating electronic mail subscription address lists is disclosed. When a subscription request for a particular subscriber address is received, a unique token associated with the address is generated and a verification message containing the token is sent to the designated subscription e-mail address. The subscription is not considered valid until a confirmation message containing the token and associated subscription address is received in reply. When a confirmation message is received, it is processed to extract the received token and subscriber address. If the returned token is valid, the received subscriber address is added to one or more subscription address lists.

22 Claims, 6 Drawing Sheets

Welcome to our Double Opt-in™ system, the free and easy way to get the latest news on special offers and discounts on products and services.

This is no spam! You'll get information about only those product categories that you specifically request! And you can get off our lists at any time!

*Select one or more topics of interest and provide your e-mail address. Additional information is optional.*

- ☐ Announcements
- ☐ Free Stuff
- ☐ Surveys
- ☐ Business
- ☐ Sports
- ☑ Computers
- ☐ Music
- ☐ Travel

22

| Name: | John Doe |
|---|---|
| EMail Address: | jdoe@address.com |

24

URL of your Web Site:
If you have a web site of your own, please share your URL with us!
http://www.doetech.com/work

| Work Address: | 123 Main Street |
|---|---|
| City: | Anytown |
| State: | New York ▼ |
| Country: | USA |
| Zip/Postal Code: | 12345 |

26

[ Sign Up! ]

From: <confirm@postmasterdirect.com>
To: address.com<John_Doe>
Date: 10/15/98 2:33pm
Subject: PostMasterDirect: REPLY to CONFIRM [jdoe@address.com/9052]

CONFIRMATION OF PostMasterDirect SUBSCRIPTION REQUEST

****** YOU MUST REPLY TO THIS MESSAGGE
****** TO CONFIRM THAT YOU WISH TO RECEIVE PostMasterDirect MAIL
****** OR, TO CONFIRM VIA THE WEB, VISIT THIS URL:

http://signup.postmasterdirect.com/confirm?E=jdoe@address.com&T=9052

If asked, your codes are  E: jdoe@address.com and T: 9052

You will NOT be subscribed unless you visit the URL above, or REPLY to this message, sending us the codes in the subject line.

We have just received a subscription request to add you to the free lists run by PostMasterDirect. If this subscription request is in error, do nothing, you will NOT receive any mail from us. If you DID submit this subscription request, you MUST hit reply in order to be subscribed!

This confirmation is to validate the subscription request we received via the PostMasterDirect web site. If someone else signed you up, the information below might be useful in finding out who is doing this to you.

For your reference:

Site request was received from: PostMasterDirect
        Exact time of request: Thu Oct 15 14:33:24 1998
           IP Address received: 207.124.139.100
        Email Address received: jdoe@address.com
                Browser of user: Mozilla/4.04 [en] (WinNT; I ;Nav)

Lists requested

PostMasterDirect/Computers.list

You will not be subscribed unless you hit REPLY on this message, leaving the codes in the subject line.

** jdoe@address.com

CONFIRMATION DATABASE 42

| ID | TOKEN | TIME STAMP | CONFIRMED? | CONFIRMATION TIME STAMP | # FOLLOW-UPS |
|---|---|---|---|---|---|
| bill@mail.com | 9851 | 10/11/98 09:15:39 | N | - | 1 |
| jdoe@address.com | 9052 | 10/15/98 14:33:24 | Y | 10/17/98 11:44:01 | 0 |
| mark@mail.org | 3357 | 10/16/98 22:18:02 | Y | 10/17/98 20:35:11 | 0 |
| janed@address.com | 1019 | 10/19/98 03:54:12 | N | - | 0 |

Fig. 5

DOUBLE OPT-IN™ METHOD AND SYSTEM FOR VERIFYING SUBSCRIPTIONS TO INFORMATION DISTRIBUTION SERVICES

TECHNICAL FIELD

This invention is related to a method for ensuring that voluntary subscriptions to a computerized information distribution system are authentic through the use of verification based on a Double Opt-in™ method and system.

BACKGROUND OF THE INVENTION

A popular form of advertising on large private networks or public networks, such as the Internet, is through the use of electronic mail. In a typical scenario, companies purchase or collate lists of user e-mail addresses and then send unsolicited commercial messages, such as advertisements, announcements, etc., to those users. Commonly known as "spam" or electronic junk mail, these messages often relate to goods or services which the recipient doesn't want or need. The response rate to these types of unsolicited messages is extremely low, typically less than one-tenth of one percent, and the vast majority of the messages are deleted without even being read. In addition, because of the volume of unsolicited messages received by a typical party, there is a high likelihood that the recipient will become biased against the sponsor of the message because of the unwelcome method of delivery, even if they might otherwise be interested in the subject matter.

One approach to this problem is to target messages to particular individuals according to their interests by allowing individuals to "subscribe" to particular mailing lists in advance. In a typical situation, an individual accesses an Internet web-page which provides a list of various subject categories. The individuals then subscribe to one or more categories that interests them and provide their e-mail address and various types of demographic information.

The premise behind this approach is that the listed addresses represent individuals who have taken the affirmative step of voluntarily signing up to receive commercial e-mail about topics of interest, and thus the response rate should be greater than completely unsolicited e-mail. However, this premise is only somewhat correct. In practice, a certain percentage of subscriptions are not made by the listed party, but rather result from the action of third parties. Thus, when a company uses a given subscription list to target commercial messages, many of the recipients will consider the messages to be unsolicited advertisements, resulting in the generation of bad-will toward the company. Even if the recipient is provided with the option of having themselves removed from the mailing list, this option is not available until after the fact, and so is relatively ineffective in preventing at least some unsolicited messages from being sent.

Accordingly, it is an object of the present invention to provide a system and method by which a subscription address list may be generated with the assurance that substantially all of the listed addresses represent individuals who have voluntarily signed up to receive messages related to particular topics.

It is a further object of the invention to provide a subscription system and method which does not require an individual who has been subscribed against their will to take any action to be removed from the mailing list.

SUMMARY OF THE INVENTION

These and other objects are provided by a method and system in which an interest-based electronic address mailing list is generated by a Double Opt-in™ method and system, as described herein. According to the invention, potential subscribers access an electronic bulletin board or Internet site and voluntarily subscribe to one or more mailing lists by entering their e-mail address and selecting one or more subject areas of interest. Once a subscription request is received, a unique alphanumeric token is generated and associated with the e-mail address. The subscription request is then is added to a list of pending subscriptions.

Next, an automated verification message is generated and sent to the entered e-mail address to confirm the subscription. The message indicates that a subscription request has been received and contains the unique token. The subscription is not considered valid until confirmed by a response that contains both the e-mail address and the associated unique token. Preferably, the response is made via an e-mail reply to the verification message or access to a designated Internet site which accepts the verification information from the user.

When a response containing both the subscribed e-mail address and the associated unique token is received, the subscription is confirmed and the subscriber information is added to the appropriate subscription lists. If a confirmation response is not received the subscription is considered invalid and the e-mail address is not added to any subscription lists. Because the unique token that is required to confirm a subscription request is only made available via e-mail sent to the entered address, an involuntary subscription can only be made if a third party has access to the subscribed e-mail address or receives a copy of the verification message, both of which are unlikely. Thus, subscription lists generated according to the Double Opt-in™ method and system of the invention are very reliable and are unlikely to contain any involuntary entries.

BRIEF DESCRIPTION OF THE DRAWINGS

The foregoing and other features of the present invention will be more readily apparent from the following detailed description and drawings of illustrative embodiments of the invention in which:

FIG. 3 is an example of a verification message;

DETAILED DESCRIPTION OF THE PREFERRED EMBODIMENTS

Figure 1:
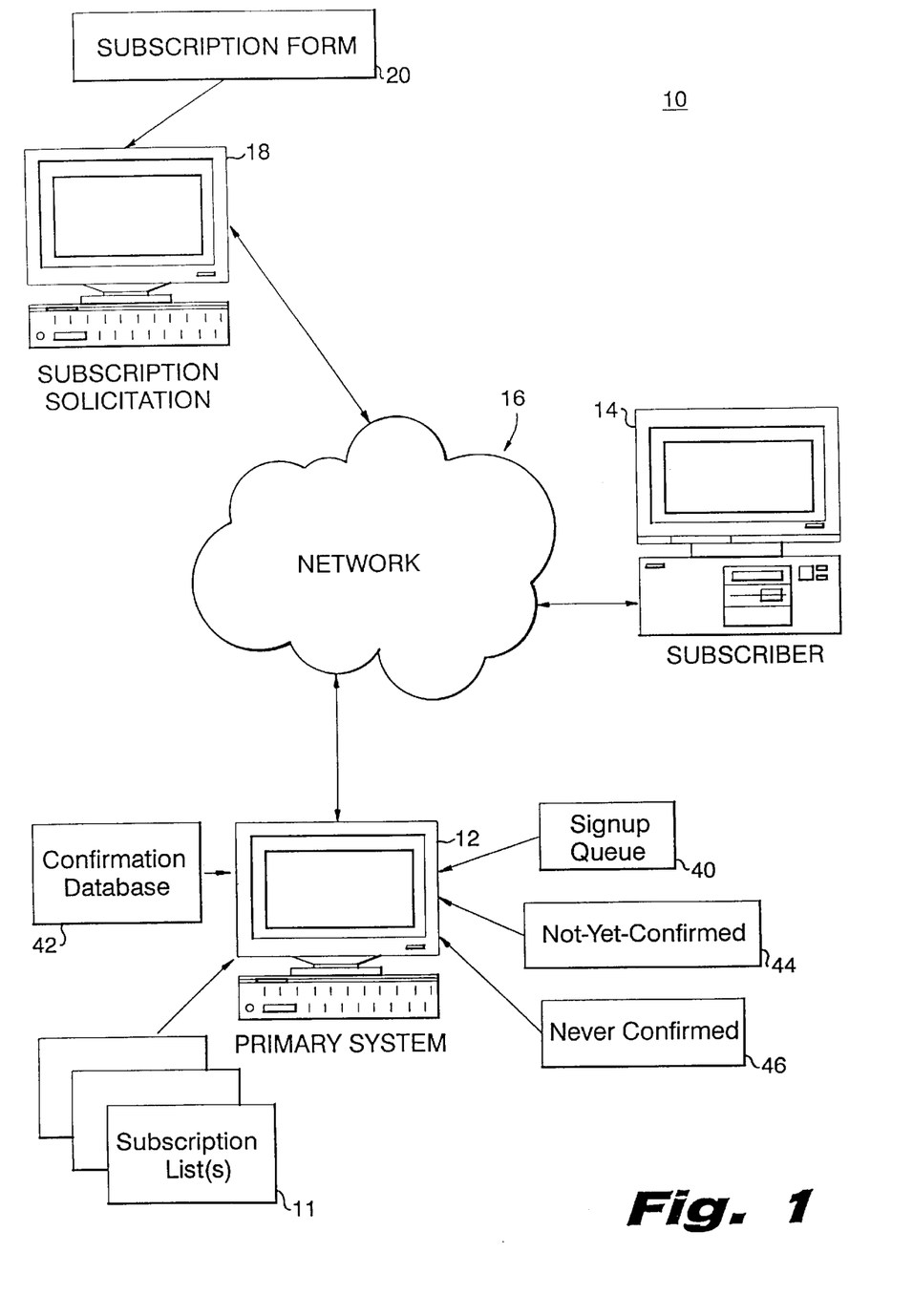
FIG. 1 is a high-level diagram of a system for implementing Double Opt-in™ method and system according to the invention.

Turning to FIG. 1, there is shown a system 10 for implementing a Double Opt-in™ method and system for generating commercial e-mail mailing lists 11 according to the invention. The system 10 includes a primary computer 12 for generating and preferably storing mailing lists 11 for use in the Double Opt-in™ method and system. Primary computer 12 is connected to a plurality of subscriber systems 14 through a network 16, such as the Internet. Each subscriber 14 is provided with a subscriber e-mail address which may be used to direct messages through the network 16 to a particular subscriber 14.

Figure 2:
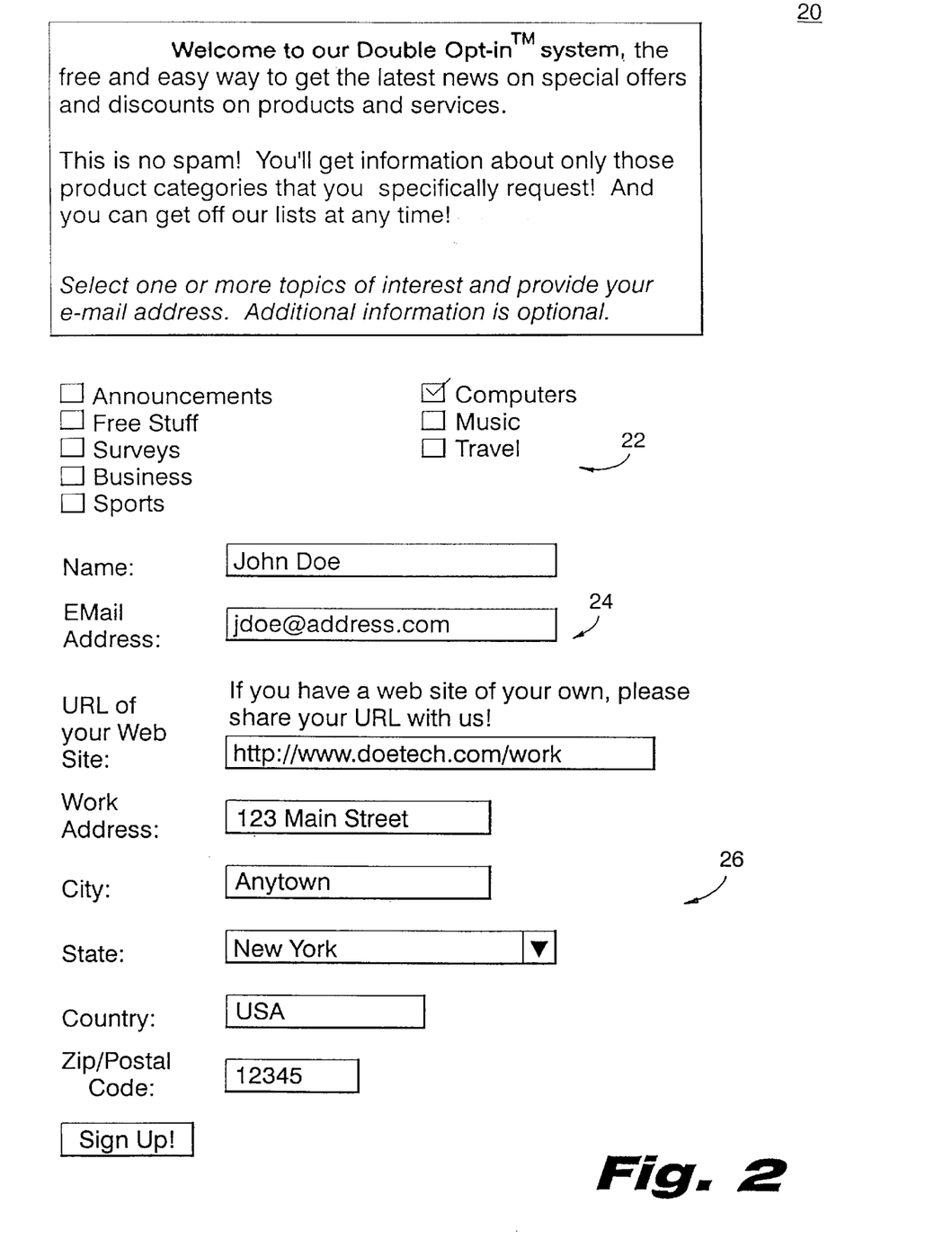
FIG. 2 is a sample subscription solicitation form.

A party interested in placing their e-mail address on a mailing list 11 accesses an electronic bulletin board or Internet site, which may be housed on the primary system 12 or a third party subscription computer 18, through the network 16 by conventional means, such as an Internet browser. The subscriber is then provided with a subscription form 20 which may be stored on the solicitation computer and provided on demand. A sample subscription form 20 is illustrated in FIG. 2. The subscriber is requested to select from various topics of interest 22 and to provide the e-mail address 24 to which informational messages should be directed. Various additional demographic information 26 may be requested as well. It is understood that default topic selections may be provided. Alternatively, for a single-topic system, there is no need to select particular topics.

Once user enters the requested information, the subscription request is provided to the primary system 12, either directly, if the form 20 is housed on the primary system 12, or indirectly through the network 16 if the subscription information form 20 is entered into a third party computer 18 or other location. Various additional mechanisms for gathering subscription requests and directing them to the primary system 12 may also be utilized.

As discussed in more detail below, once a subscription request is received by the primary system 12, a unique token is generated and associated with the e-mail address. The subscription request is then is added to a signup queue 40 and a record of the request is added to a confirmation database 42. The signup queue 40 and confirmation database 42 are used to during the processing of subscription requests, as discussed below, and are preferably stored within the primary system. Additional files which may be used during subscription request processing, such as a not-yet confirmed list 44 and a never-confirmed list 46, are also preferably stored within the primary system.

Next, an automated verification message 30 is generated and sent to the entered e-mail address to confirm the subscription. A sample verification message 30 is shown in FIG. 3. The message 30 indicates that a subscription request has been received and is directed to the e-mail address 32 designated in the subscription request. In addition, the message 30 contains a verification code including the generated token 34 and preferably the associated e-mail address 32. The subscription request is not considered valid until the primary system 12 receives a confirmation message containing the unique token and the associated e-mail address, if necessary for verification.

Preferably, the confirmation is in the form of an e-mail reply to the verification message 30. In the preferred embodiment, the token 34 and associated e-mail address 32 are included in the subject portion 36 of the message 30 so that this information will automatically be included in the subject portion of the reply message. Alternately, a subscriber can access a designated Internet URL 38 which will accept the verification information from the user.

In addition, a list of the selected topics may be embedded within the body of the message itself, perhaps following a unique identifier 37. The designated subscription e-mail address 32 may also be identified by a unique identifier. The use of identifiers 37 and 39 simplifies the processing of subscription and unsubscription requests by making it easier to extract this information from a received message.

When the primary system 12 receives a confirmation message, the included information is verified to ensure that a valid token has been returned. Once the confirmation is verified, the subscription is confirmed and the subscriber information is added to the appropriate subscription lists 11. If a confirmation response is not received, preferably within a predetermined amount of time, the subscription is considered invalid and the e-mail address is not added to any subscription lists.

The primary system 12 and subscription solicitation system 18 may be implemented using a conventional computer data server that is connected to the Internet. The various data processing and list generating routines can be implemented using various programming languages such as C, Visual Basic, Java, etc. In a preferred implementation of the invention, a server which can support a large number of concurrent users is provided, preferably a UNIX system, with the Internet applications programmed in meta-HTML. It is understood that such a system will also include a processor and various forms of data storage and may be a single unit or a number of separate units operating in a cooperative manner.

Figure 4A:
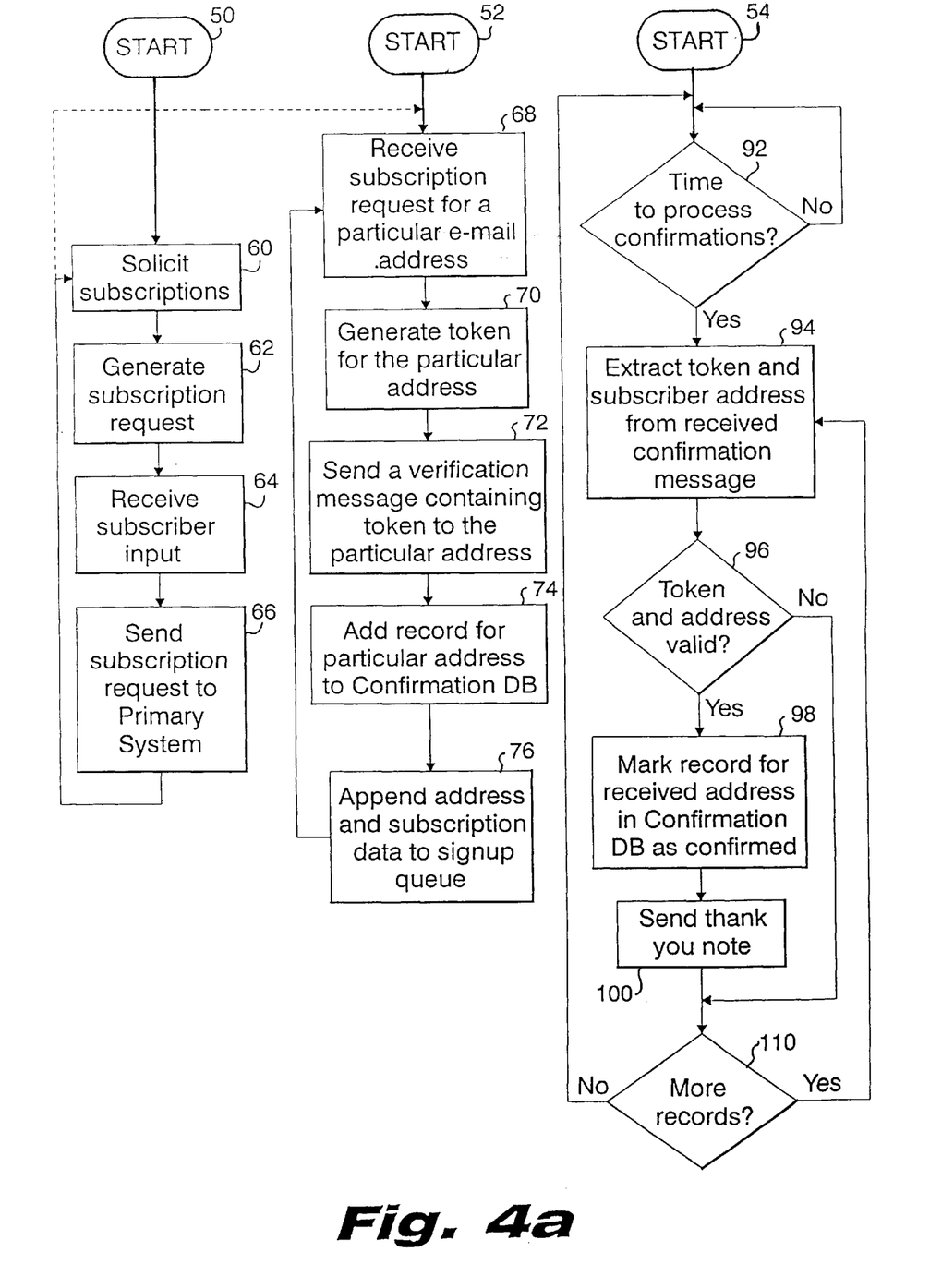
FIGS. 4a and 4b are flowcharts representing a preferred method of implementing a Double Opt-in™ method and system according to the invention.
Figure 4B:
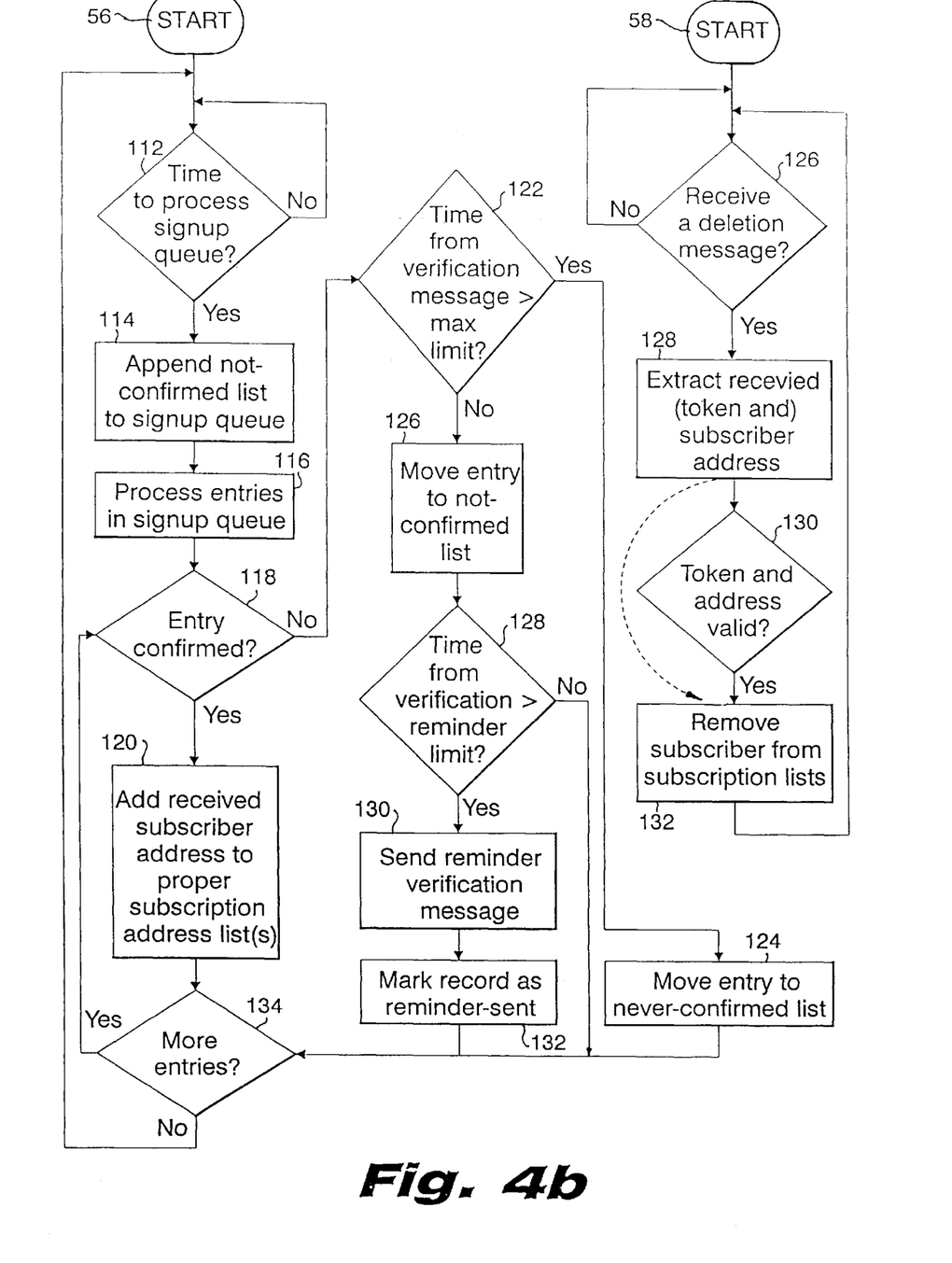

Turning to FIGS. 4*a* and 4*b*, there is illustrated a flowchart of the various processes involved in a Double Opt-in™ method and system according to a preferred implementation of the invention. Five processes are shown, (a) soliciting subscriptions 50, (b) processing subscription requests 52, (c) processing confirmation messages 54, (d) confirming subscription or sending reminder 56, and (e) processing deletion requests 58. Preferably, all of the processes are implemented on the same computer system. However, various separate computers may be employed to implement the processes and each step need not be implemented in full for the invention to operate properly.

(a) Soliciting Subscriptions 50

The process of soliciting subscriptions 50 provides a mechanism for a potential subscriber to enter their e-mail address and possibly to select one or more topics of interest. Preferably, subscriptions are solicited by presenting an appropriate subscription form in response to the request of an interested party or in conjunction with a user's interaction with a third party system. (Steps 60, 62). For example, an individual may access an Internet merchant to purchase a particular item, such as a book. In conjunction with taking the purchase order, the merchant's system asks whether the purchaser is interested in receiving e-mail notices about new books on topics similar to the one being purchased, special offers, etc. The purchaser may also be asked whether they are interested in receiving e-mail notices about other new books and to select from particular topics of interest. If the purchaser is interested in receiving these notices, the entered information along with a designated e-mail address are compiled into a subscription request which is sent to the primary system 12. Alternatively, a subscriber may simply be presented with a subscription form, such as shown in FIG. 2. Once the necessary subscription information is received (step 64), a subscription request including the subscriber's e-mail address and other entered information is generated. If the subscription request is generated by a third-party or remote system 12, the request is sent to the primary system (step 66).

(b) Processing Subscription Requests 52

Each time a subscription request is received, the requested subscriber e-mail address 32 is determined and a token 34 uniquely associated with the address is generated. (Steps 68, 70). Preferably, tokens 34 may be generated randomly. Alternatively, the tokens 34 can be generated sequentially and are associated on a one-to-one basis with the particular subscriber e-mail address 32 at issue. After the token has been chosen, a verification message containing the token, such as shown in FIG. 3, is generated and sent to the particular subscriber e-mail address (step 72).

Figure 5:
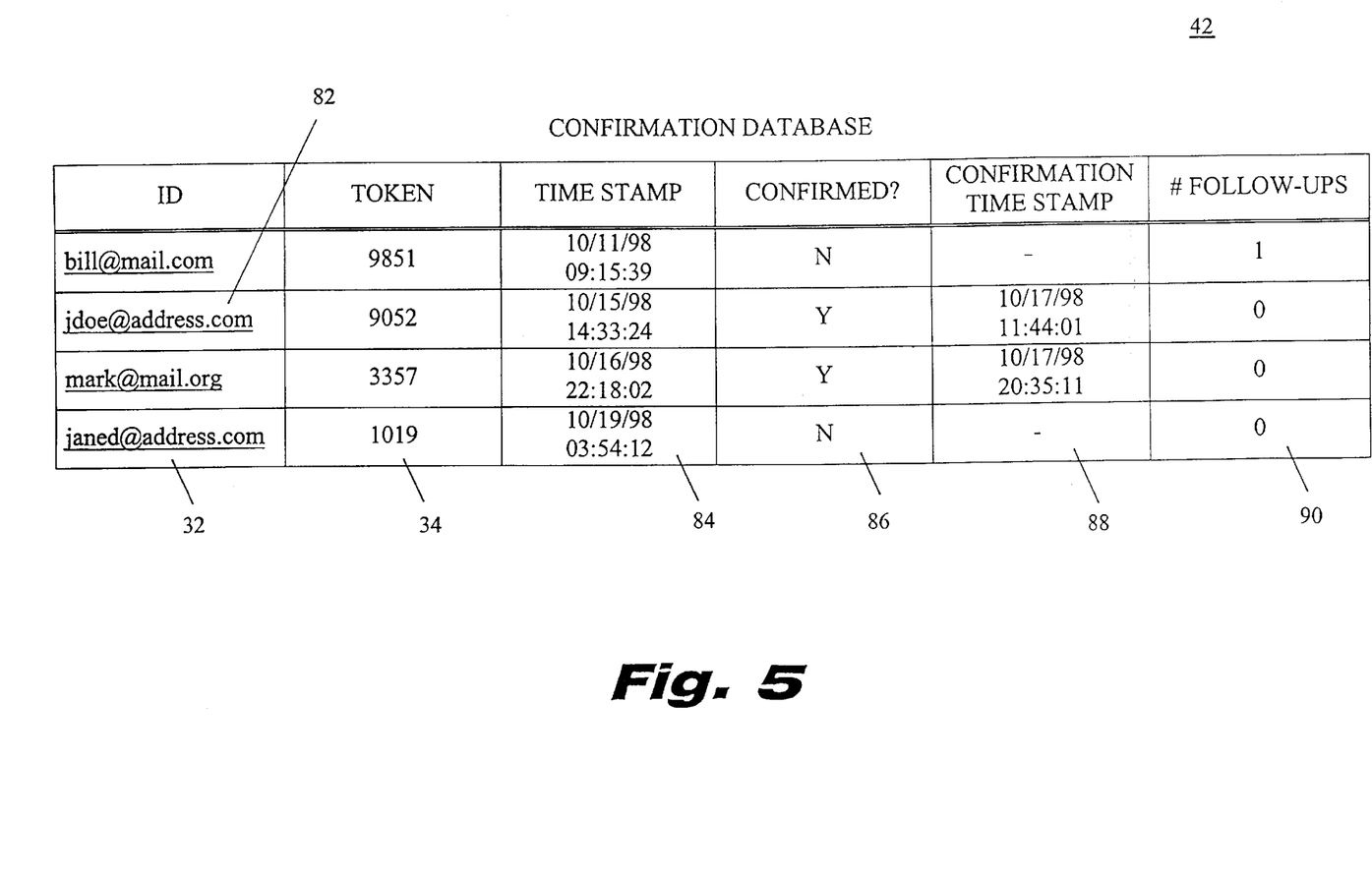
FIG. 5 is a example of a confirmation database.

In addition, a new record 82 is created in the confirmation database 42 and used to store the E-mail addresses 32 and the associated token 34. A sample confirmation database 42 is generally illustrated in FIG. 5. The record 82 may also contain a time stamp 84 indicating when the verification message was sent, a confirmation field 86 which indicates whether the request has been confirmed, a confirmation time stamp 88 recording when a request was confirmed, and a follow-up field 90 recording the number of confirmation reminders which have been sent. The confirmed field 86 is initially set to "No."

In addition, the subscription information is added to the end of a signup queue 40 (FIG. 1). The signup queue is used to temporarily store the information contained in the received subscription request.

(c) Processing Confirmation Messages 54

To confirm a subscription request, the designated subscriber must return a confirmation message which includes the token associated with the particular subscriber e-mail address to the list-generating system. Preferably, confirmation requests are directed to a predefined "confirmation" e-mail address such that all mail received at that address is presumed to be a confirmation message. Confirmation messages may be identified by a particular identifier included in the message. In the preferred embodiment, confirmation requests are allowed to accumulate over a period of time, such as a 24-hour period, and then processed in a batch. Alternatively, confirmations may be processed immediately upon receipt. In another embodiment, confirming subscribers may enter the confirmation information directly via a confirmation form located at a designated confirmation URL 38.

When it is time to process a received confirmation (step 92), the confirmation message is parsed to extract the included token and address (step 94). Once the confirmation information has been extracted, the information is verified (step 96). The manner of verification is dependent on the methods used to generate the tokens and the associated subscriber addresses. In the preferred embodiment, the confirmation database 42 is scanned to locate the record 82 for the subscriber address that matches the received address. The received token is then compared to the token 34 stored in that record. Verification may also be performed in reverse by searching the database 42 for a matching token and then verifying that the associated address matches the received address. Once a confirmation message is verified, the confirmation field 86 in the identified subscription verification list record is marked as "Yes" (step 98). In the preferred embodiment, after a subscription has been confirmed, a supplemental thank-you message is also sent to the subscriber (step 100), preferably from a predetermined e-mail address. If the message cannot be verified (i.e., the token is incorrect), it is not processed further.

In the preferred embodiment, the value of a particular token is independent from the particular subscription e-mail address and therefore a list of the tokens for particular subscriber addresses must be maintained. However, tokens may also be generated by means of a predetermined algorithm which processes the subscriber e-mail address 32 to generate a coded token. In one variation, the encoding can be one-way, such that the e-mail address cannot be recovered from the token. To verify a given token is correct, the subscriber must provide both the subscription e-mail address and the token. The received e-mail address is processed using the same algorithm to generate a check token. If the received check tokens match, the confirmation is valid.

In a second variation, the subscriber e-mail address is processed using a reversible algorithm to generate a token which is essentially an encoded version of the address. Using this variation, a received token could be processed in reverse to extract the associated e-mail address. This variation advantageously reduces the amount of information which must be provided to confirm a subscription. In addition, it eliminates the need to maintain a table of address-token associations. Although this variation is somewhat less secure than other methods, a false confirmation would only be possible if a third party knew the particular encoding process.

(d) Confirming Subscription/Sending Reminders 56

It can be appreciated that once a confirmation message is verified, the confirmed subscriber may be immediately added to the particular subscription address lists. Preferably, however, the subscription address lists are updated on a periodic basis, typically once each day, according to the information in the verification list.

In the preferred embodiment of the invention, the pending subscriptions are evaluated by processing entries in the signup queue 40, where each entry represents a subscription request which has not yet been added to any lists. When it is time to process the members in the signup queue (step 112), any entries which are currently present in the not-confirmed list 44 are moved into the signup queue (step 114). The not-confirmed list 44, discussed further below, contains subscription entries which were previously processed by this routine, but which were not yet confirmed. Thus, the contents of the signup queue 40 represent the outstanding subscription requests, i.e., newly received subscription requests and older requests which were not previously confirmed.

Each entry in the signup queue is then processed in turn (step 116). For each entry, the subscription e-mail address is determined and used to access the confirmation database 42 to determine whether the subscription has been confirmed (step 118). If a valid confirmation has been received, the entry is removed from the signup queue and the subscription address is added to the appropriate subscription mailing lists 11 (step 120). Additional information may also be stored as needed, such as a database which contains a record of every list to which each subscriber has been added. For example, the subscription information may be stored within the confirmation database. Alternatively, a separate confirmed subscriber database may be used. Various data processing techniques known to those of skill in the art may be used to generate, maintain, and search the specific data files used in conjunction with the method and system of the invention.

If the entry is not confirmed, the confirmation database 42 is used to determine how long ago the verification message was sent. If this time is greater then a maximum confirmation time limit, the entry is moved from the signup queue to the never-confirmed list 46 (step 124). In the preferred embodiment, the maximum time to confirm is 15 days. The never-confirmed list 46 is useful, among other things, for historical system analysis. Alternatively, the entries may simply be discarded.

If the unconfirmed subscription has been pending for less than the maximum amount of time, the entry is moved from the signup queue into the not-confirmed list 44 (step 126). This list has the same general form as the signup queue and preferably, the only difference between the two is in the status of the entries.

In the preferred embodiment, a reminder is also sent if a subscription request remains pending for longer than a predetermined period of time (which is less than the maximum confirmation time limit). If the time since the verification message is greater than the reminder limit (step 128) a reminder verification message similar to the original verification message is sent (step 130) and the follow-up field 90 for the appropriate record 82 in the confirmation database 42 (see FIG. 5) is incremented (step 132). In the preferred embodiment, the system will only send one reminder.

Thus, a processed entry is removed from the signup queue and either used to update the subscription address lists, added to the not-confirmed list, or added to the never-confirmed list. If there are additional entries in the signup queue, the process is repeated (step 134). Those skilled in the art will recognize that alternate mechanisms for tracking subscription requests may be used instead.

At a minimum, each mailing list contains a collection of one or more subscriber e-mail addresses. In addition, demographic information for the subscribers may also be contained within each mailing list. Such demographic information may then be used to select only specific subscribers to a list according to various requirements. Preferably, separate mailing lists are maintained for each topical category. However, two or more lists may be contained within a single logical "file" and subscriptions to specific lists identified by various flags associated with each entry.

After a verified address is added to the subscription lists, the record may be purged from the confirmation database. This would have the result of requiring already subscribed users to re-confirm if they sign up to additional lists at a later date. Similarly, invalid subscription requests may also be purged. However, in the preferred embodiment, such records are retained to simplify processing and for historical reasons.

(e) Removing Subscriber from List 58

In a further aspect of the invention, a subscriber who erroneously confirmed the subscription can easily have their address removed from the various subscription lists. As discussed above with respect to step 100, a thank-you message, which may include the associated token, is sent to a confirming subscriber. Preferably, the message is sent from a dedicated e-mail address to which deletion messages should be sent. If the subscriber replies to the thank-you message, the reply will be directed to the dedicated deletion e-mail address and automatically considered by the system to be a deletion request. Other (non-reply) messages directed to the deletion e-mail address may also automatically be considered deletion requests. In an alternative embodiment, the subscriber may be required to include a indication that he does not want to subscribe any longer. In this embodiment, when a deletion message is received (step 126), the subscriber address 32 is extracted, for example by scanning the subject line 36 or the body of the message for a unique identifier 39 (see FIG. 3).

A deletion request can be a general request to remove a subscriber from all lists or a specific request to remove the subscriber from one or more designated lists. For example, in the preferred embodiment, a confirmed subscriber is provided with an opportunity to change his mind and request deletion from all lists by sending a reply to the confirmation thank-you note. Accordingly, the receipt of a thank-you note reply, which can be identified by the subject line, is a general request from the subscriber to remove them from all the lists. If the general request does not contain a record of the subscribed lists, this information is retrieved from the appropriate database. When a directed mail message (i.e., a commercial advertisement) which has sent using lists generated from the present system is returned to the designated deletion address, it is considered to be a request to be removed from the specified list used for that mailing. To this end, directed mailings preferably include the name of the mailing list which was used (designated by a unique identifier 37). Once the appropriate list information is determined, the subscriber is removed from the designated list(s) (step 132).

Preferably, deletion requests do not require verification. In an alternative embodiment, return of a unique token is required for a deletion request to be valid to prevent unauthorized unsubscribe requests, and the token is also preferably included in within the thank-you note to allow for the "reply to thank-you note" general deletion request discussed above. In this embodiment, the token must also be extracted from the deletion request and verified (step 130). If the deletion message is verified, the subscriber is removed from the appropriate mailing lists as discussed above (step 132).

Accordingly, the Double Opt-in™ method and system according to the invention provides one or more mailing lists which have a significantly improved degree of confidence in the desire of the listed subscribers to receive directed messages about particular topics. In the preferred embodiment, after one or more subscription lists have been generated for use in the Double Opt-in™ method and system, use of the list is made available to parties desiring to send directed messages to individuals with particular interests and who have agreed to receive such messages. In practice, a party will select mailing lists, either by topic, other demographic criteria, or a combination, and provide a particular message to be sent.

According to the invention, the designated message is modified to include specific information which is identified by one or more unique identifiers 37, 39. The selected lists are then processed and the message is sent to each appropriate subscriber. If more than one list is selected, the subscriber lists can be pre-processed to prevent a subscriber appearing in multiple lists from receiving more than one message. Alternatively, the generated mailing lists themselves for use in the Double Opt-in™ method and system may be provided to requesting parties. Preferably, however, the mailing lists are kept confidential. Keeping the e-mail addresses in the various mailing lists secret and preventing the distribution of the associated demographic information encourages people to subscribe by allaying their fear that entering subscription information will result in unwanted junk mail.

It can be appreciated that the Double Opt-in™ and system according the invention is not limited to the generation of e-mail address lists but may also be used for other similar types of subscription services, such as informational messaging system accessible through voice-mail or paging services. Subscriptions may be made via computer networks or over conventional telephonic connections where the necessary information is entered, for example, via DTMF tones. In these environments, the subscriber address is the voice-mail or pager number. A verification message containing a numeric token can sent in the form of a page or computer generated voice mail message. Confirmation can be via a telephone call to a designated number where the caller enters their address (phone/pager number) and the designated numeric token through the telephone keypad. Alternatively, voice recognition technology can be used to process the address and token.

While the invention has been particularly shown and described with reference to preferred embodiments thereof, it will be understood by those skilled in the art that various changes in form and details may be made without departing from the spirit and scope of the invention.

We claim:

1. A method for generating subscription address lists comprising the steps of:
    receiving a subscription request containing a particular subscriber address;
    generating a token associated with the particular subscriber address;
    sending a verification message containing the token to the particular subscriber address;
    receiving a confirmation message;
    parsing the confirmation message to extract a received token and a received subscriber address;
    verifying that the received token is associated with the received subscriber address; and
    adding the received subscriber address to a subscription address list in response to a successful verification of the confirmation message.

2. The method of claim 1, further comprising the step of soliciting a subscription request.

3. The method of claim 1, wherein:
    the subscription request further contains at least one selected topic;
    said step of adding comprises the step of adding the received subscriber address to one or more subscription address lists in accordance with respective selected topics.

4. The method of claim 1, further comprising the step of adding a record containing at least the subscriber address and the token to a confirmation database.

5. The method of claim 4, where the step of verifying comprises the steps of:
    scanning the confirmation database to identify a record having a subscriber address matching the received subscriber address;
    extracting the token from the identified record; and
    comparing the extracted token with the received token.

6. The method of claim 5, further comprising the step of marking the identified record as confirmed in response to a successful verification.

7. The method of claim 6, wherein the step of adding the received subscriber address to the subscription address list comprises the steps of:
    processing entries in a list of previously unconfirmed subscription requests;
    determining whether a particular entry has been confirmed; and
    adding a subscriber address associated with the particular entry to the subscription address list if said entry has been confirmed.

8. The method of claim 1, further comprising the step of sending a reminder verification message to the particular subscriber address if a confirmation message containing the particular subscriber address and the associated token is not received within a predetermined amount of time.

9. The method of claim 1, further comprising the step of sending a thank-you message to the received subscriber address in response to a successful subscription confirmation.

10. The method of claim 9, further comprising the step of removing the received subscriber address from the subscription address list in response to receiving a reply to the thank-you message.

11. The method of claim 1, wherein the token is generated by applying a predetermined algorithm to said particular subscriber address.

12. The method of claim 11, wherein the step of verifying comprises the steps of:
    applying the predetermined algorithm to the received subscriber address to generate a check token; and
    comparing the check token with the received token.

13. An electronic mail subscription address list generated according to the method of claim 1.

14. A system for generating subscription address lists comprising: means for receiving a subscription request containing a particular subscriber address;
    means for generating a token associated with the particular subscriber address;
    means for sending a verification message containing the token to the particular subscriber address;
    means for receiving a confirmation message;
    means for parsing the confirmation message to extract a received token and a received subscriber address;
    means for verifying that the received token is associated with the received subscriber address; and
    means for adding the received subscriber address to a subscription address list in response to a successful verification of the confirmation message.

15. The system of claim 14, further comprising means for soliciting a subscription request.

16. The system of claim 14, further comprising:
    means for sending a reminder verification message to the particular subscriber address if a confirmation message containing the particular subscriber address and the associated token is not received within a predetermined amount of time.

17. The system of claim 14, further comprising means for sending a thank-you message to the received subscriber address in response to a successful confirmation.

18. The system of claim 14, further comprising means for removing the received subscriber address from the subscription address list in response to receiving a reply to the thank-you message.

19. A method for electronically distributing a directed message to pre-selected e-mail addresses comprising the steps of:
    receiving a subscription request containing a particular subscriber e-mail address;
    generating a token associated with the particular subscriber e-mail address;
    sending a verification message containing the token to the particular subscriber e-mail address;
    receiving a confirmation message;
    parsing the confirmation message to extract a received token and a received subscriber e-mail address;
    verifying that the received token is associated with the received subscriber e-mail address;
    adding the received subscriber e-mail address to a subscription address list in response to a successful verification of the confirmation message;
    receiving said directed message;
    sending said directed message to at least one subscriber e-mail address contained in said subscription address list.

20. A directed message sent to a particular subscriber e-mail address according to the method of claim 19.

21. A system for generating subscription address lists comprising:

a subscription solicitation system connected to a distributed computer network and receiving subscription requests each including a particular subscriber e-mail address;

a primary computer system connected to said network and receiving said subscription requests;

said primary computer system comprising:

a token generator providing a token associated with the particular subscriber address;

a verification message generator providing a verification message directed to the particular subscriber address and including said associated token;

an electronic mail server receiving said verification message as input and directing said verification message to the particular subscriber address;

a confirmation subsystem responsive to the receipt of a confirmation message by said electronic mail server to extract a received token and a received subscriber address from the confirmation message;

a comparator receiving the received token and the token associated with the received subscriber address as inputs and providing a verification signal as output, said verification signal indicating a successful verification when said inputs are equal; and     a mailing list generation subsystem receiving said verification signal and received subscriber address as input and appending the received subscriber address to a subscription address list when said verification signal indicates a successful verification.

22. The system of claim 21, wherein said subscription solicitation system is a subsystem of said primary computer system.

\* \* \* \* \*